United States Patent [19]

Sugiyama et al.

[11] Patent Number: 4,693,215
[45] Date of Patent: Sep. 15, 1987

[54] INLET PORT FOR INTERNAL COMBUSTION ENGINE

[75] Inventors: Katsuhiko Sugiyama; Hiromitsu Kawazoe; Yoshinori Idota, all of Aichi, Japan

[73] Assignee: Kabushiki Kaisha Toyota Chuo Kenkyusho, Aichi, Japan

[21] Appl. No.: 789,370

[22] Filed: Oct. 21, 1985

Related U.S. Application Data

[63] Continuation of Ser. No. 531,391, Sep. 12, 1983, abandoned.

[30] Foreign Application Priority Data

Sep. 18, 1982 [JP] Japan ................................ 57-162934
Mar. 30, 1983 [JP] Japan ................................ 58-56113

[51] Int. Cl.⁴ ............................................. F01L 3/00
[52] U.S. Cl. ................................. 123/188 M; 123/308
[58] Field of Search ........................... 123/188 M, 306

[56] References Cited

U.S. PATENT DOCUMENTS

| 2,920,613 | 1/1960 | Vogel et al. | 123/188 M |
| 3,020,896 | 2/1962 | Meurer et al. | 123/188 M |
| 3,020,899 | 2/1962 | Mueller | 123/188 M |
| 3,021,826 | 2/1962 | Fezzy et al. | 123/188 M |
| 4,015,577 | 4/1977 | Elsbett et al. | 123/188 M |
| 4,207,854 | 6/1980 | Alford et al. | 123/188 M |
| 4,286,554 | 9/1931 | Okamoto | 123/188 M |
| 4,303,046 | 12/1981 | Nakanishi et al. | 123/188 M |
| 4,312,309 | 1/1982 | Nakanishi et al. | 123/188 M |
| 4,491,102 | 1/1985 | Nakasima | 123/188 M |

FOREIGN PATENT DOCUMENTS

| 888036 | 7/1953 | Fed. Rep. of Germany | 123/188 M |
| 1476080 | 11/1969 | Fed. Rep. of Germany | 123/188 M |
| 2922058 | 12/1979 | Fed. Rep. of Germany | 123/188 M |
| 2122942 | 4/1980 | Fed. Rep. of Germany | 123/306 |
| 2450949 | 11/1980 | France | 123/188 M |
| 46005 | 3/1980 | Japan | 123/188 M |
| 46003 | 3/1980 | Japan | 123/188 M |

Primary Examiner—Craig R. Feinberg
Assistant Examiner—David A. Okonsky
Attorney, Agent, or Firm—Mason, Fenwick & Lawrence

[57] ABSTRACT

An inlet port for an internal combustion engine having an inlet hole opened on an end face of a cylinder chamber at an off-center position, the inlet hole being provided with an inlet valve and connected to an inlet passage. The inlet passage comprises a swirl generating section which is connected to the inlet hole and surrounds the inlet valve at the end section of the inlet passage and an introducing section which is the remaining section of the inlet passage excluding the end section, the width between the peripheral surface of the valve stem of the inlet valve and the wall surface of said swirl generating section is made larger at the outside part on the wall side of the cylinder chamber than the inside part on the center side of the cylinder chamber, the introducing section is connected to the outside part of the swirl generating section, the height from the opening face of the inlet hole to the ceiling of the swirl generating section is made to decrease from the wider outside part to the narrower inside part around the valve stem, and its average rate of reduction is set between 0% and 0.18% of the inlet hole diameter per one degree around the valve stem.

10 Claims, 5 Drawing Figures

INLET PORT FOR INTERNAL COMBUSTION ENGINE

This is a continuation of application Ser. No. 531,391, filed Sept. 12, 1983 and now abandoned.

BACKGROUND OF THE INVENTION

This invention relates to an inlet port for an internal combustion engine which has an inlet hole opened on the end face of a cylinder chamber at an off-center position, the inlet hole being provided with an inlet valve and connected to an inlet passage.

Conventionally, the following types of inlet port were usually employed: a helical inlet port in which the connecting end of an inlet passage to an inlet hole forms a spiral section which gets closer to the inlet hole while turning round the valve stem of the inlet valve, and a tangential inlet port in which the connecting end of an inlet passage to an inlet hole is positioned along the tangential line from a point on the wall surface of the cylinder chamber closest to the inlet hole.

When these types of inlet port are compared, the helical inlet port can generate strong swirl inside the cylinder chamber because it has the spiral section at the connecting end of the inlet passage to the inlet hole but the pressure loss of the inlet passage is large and therefore the volume efficiency of the cylinder chamber is low. On the other hand, the pressure loss of the inlet passage is small and the volume efficiency of the cylinder chamber is high for the tangential inlet port because it has no spiral section in the inlet passage but the swirl which is generated in the cylinder chamber can not be made strong. Then, in the tangential inlet port, since the valve stem of the inlet valve is inserted through the center of the connecting end of the inlet passage to the inlet hole and the stem guide of the inlet valve is extended, the inlet air flow from the inlet passage to the cylinder chamber collides with the valve stem to be divided into two streams. Then, the divided streams, after passing the position of the valve stem, collide and interfere with each other. As a result, the swirl inside the cylinder chamber is further decreased. Besides, the dividing ratio of the above inlet air flow is not constant and the swirl becomes unstable.

Therefore, in the conventional types of inlet port, it is not possible to generate a suitable level of stable swirl without reducing the volume efficiency.

SUMMARY OF THE INVENTION

It is an object of the invention to provide an inlet port for an internal combustion engine which can generate a suitable level of stable swirl without reducing the volume efficiency.

The inventors of the invention noticed the following facts. The reason why the pressure loss of the inlet passage for the helical inlet port is large is because the inlet air flow in the inlet passage changes its direction of flow drastically in the spiral fashion at the spiral section which generates the swirl. Further, the reason why the swirl is weak and unstable in the tangential inlet port is because there is no swirl generating section in the inlet passage and the main stream of the inlet air flowing through the inlet passage collides with the valve stem. The inventors created new configuration to remove the causes for the disadvantages.

This invention provides an inlet port for an internal combustion engine which has an inlet hole opened on the end face of a cylinder chamber at an off-center position, the inlet hole being provided with an inlet valve and connected to an inlet passage, in which the inlet passage comprises a swirl generating section which is connected to the inlet hole and surrounds the inlet valve at the end section of the inlet passage and an introducing section which is the remaining section of the inlet passage excluding the end section, the width between the peripheral surface of the valve stem of the inlet valve and the wall surface of the swirl generating section is made larger at the outside part on the wall side of the cylinder chamber than the inside part of the center side of the cylinder chamber, the introducing section is connected to the outside part of the swirl generating section, the height from the opening face of the inlet hole to the ceiling of the swirl generating section is constant or made to decrease from the wider outside part to the narrower inside part around the valve stem, and its average rate of reduction is set to not more than 0.18% of the inlet hole diameter per one degree around the valve stem.

In this inlet port, since the inlet air flow in the inlet passage does not bend as much as for helical inlet port at the swirl generating section, the pressure loss of the inlet passage is small and, therefore, the volume efficiency of the cylinder chamber is high. Further, since the main stream of the inlet air flow inside the inlet passage flows from the introducing section to the outside part of the swirl generating section and does not collide with the valve stem of the inlet valve, the swirl which is stronger and more stable than that of the tangential inlet port can be generated. Therefore, a suitable level of stable swirl can be generated without lowering the volume efficiency.

DETAILED DESCRIPTION OF THE PREFERRED EMBODIMENTS

First Embodiment

Figure 1:
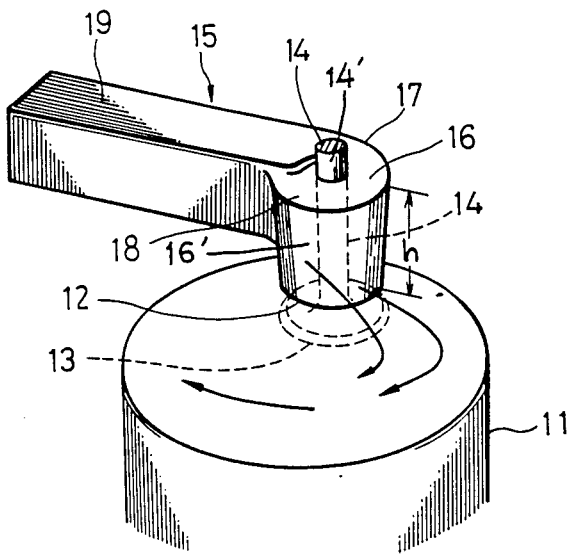
FIG. 1 is a perspective view of an inlet port of the 1st embodiment of the present invention.
Figure 2:
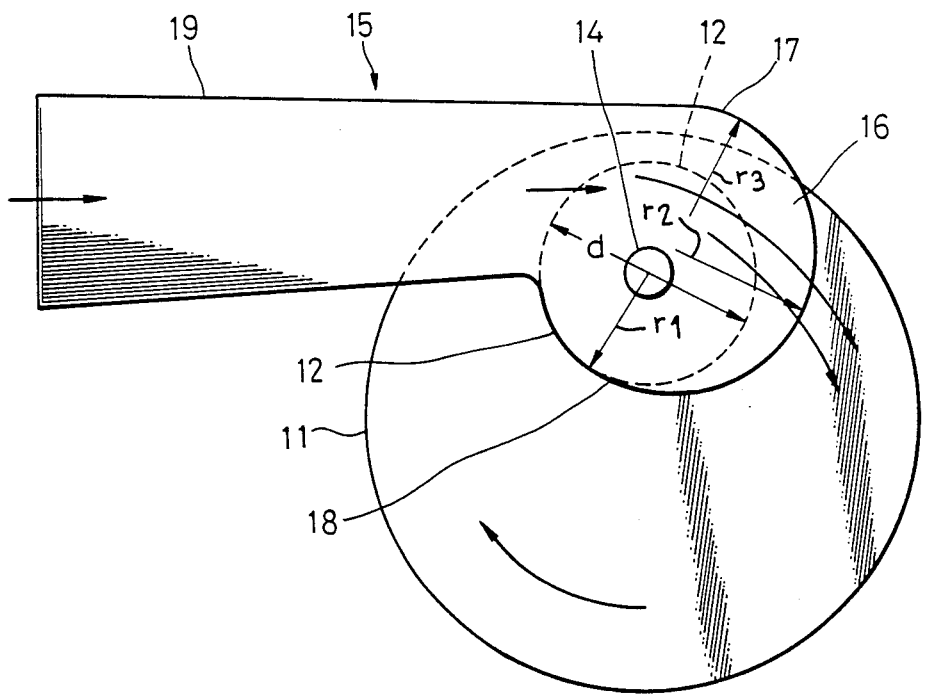
FIG. 2 is a top view of the inlet port.

An inlet port for an internal combustion engine of the first embodiment has a circular inlet hole 12 opened on a circular end face of a cylinder chamber 11 at an off-center position, as shown in FIG. 1 and FIG. 2. The inlet hole 12 is provided with an inlet valve 13 of a poppet valve type and is also connected to an inlet passage 15. The inlet passage 15 comprises a swirl generating section 16 which is connected to the inlet hole 12 and surrounds the inlet valve 13 at the end section of the inlet passage and an introducing section 19 which is the remaining section of the inlet passage excluding the end section. The wall surface 16' of the swirl generating section 16 is formed by smoothly connecting sections of three cylindrical surfaces having respective radii $r_1$, $r_2$, and $r_3$, the cylindrical surface facing to the peripheral surface 14' of the valve stem 14 for the inlet valve 13, as shown in FIG. 2. The width between the peripheral surface 14' of the valve stem 14 and the wall surface 16' of the swirl generating section 16 is wider at the outside part 17 which is proximate to the outside wall of the cylinder chamber 11 than at the inside part 18 which is proximate to the center of the end face of the cylinder chamber. The width is decreased gradually from the outside part 17 up to the inside part 18 around the valve stem 14. The introducing section 19 which is straight is connected to the wide outside part 17 of the swirl generating section 16 along its tangential direction. The height h of the wall surface 16' from the opening face of the inlet hole 12 to the ceiling of the swirl generating section 16 is constant or made to decrease gradually from the wider outside part 17 to the narrower inside part 18 around the valve stem 14, and its average rate of reduction is set to not more than 0.18% of the inlet hole diameter, d, per one degree around the valve stem 14.

In this inlet port, the inlet air flow inside the inlet passage 15 flows from the introducing section 19 to the swirl generating section 16 and flows to the cylinder chamber 11 through the inlet hole 12. The main stream of the inlet air flows from the central position of the introducing section 19 to the middle position of the wall surface of the outside part 17 for the swirl generating section and the peripheral surface of the valve stem 14, flows into the cylinder chamber 11 through the inlet hole 12 along the tangential direction from the wall surface of the cylinder chamber closest to the inlet hole, and flows along the wall surface of the cylinder chamber 11 to produce swirl.

Figure 3:
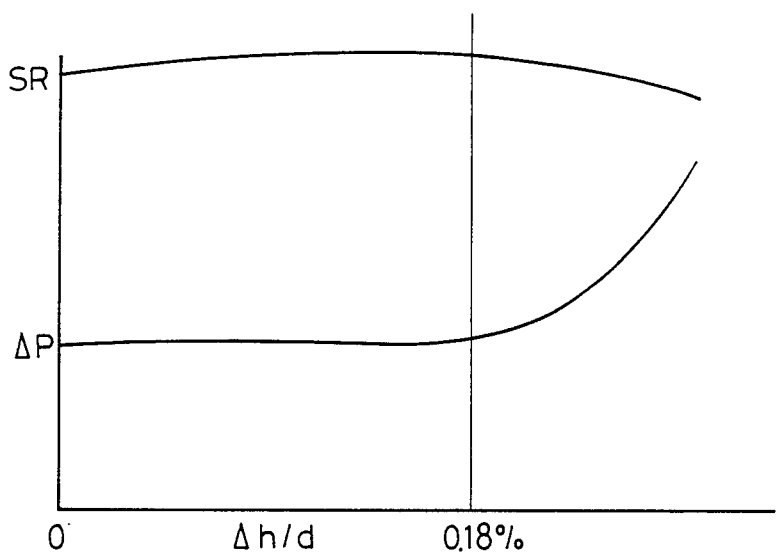
FIG. 3 is a graph indicating the relation of the reduction rate of ceiling height for the swirl generating section to the swirl ratio or the pressure loss of the inlet port.

In the inlet port of this embodiment, the rate of reduction, $\Delta h$, of the ceiling height of the swirl generating section 16 against the diameter, d, of the inlet hole is set to various values. Then, the strength of the swirl being generated in the cylinder chamber 11, that is, the swirl ratio, SR (=rotational speed of swirl/rotational speed of engine), and the pressure loss, $\Delta p$, of the inlet passage 15 were measured for each value of the rate of reduction. The result is shown in the graph of FIG. 3. The swirl ratio, SR, does not change much and is substantively constant against the change of the above stated rate of reduction, $\Delta h$, as shown in the upper section of the graph. As shown in the lower section of the graph, the presure loss, $\Delta p$, is substantially constant when the above stated rate of reduction, $\Delta h$, is within 0.18% of the inlet hole diameter, d, per one degree around the valve stem 14. But, it increases rapidly when it exceeds 0.18%. Therefore, when the value of $\Delta h/d$ per degree is set to not more than 0.18%, the increase of the presure loss is prevented and the volume efficiency becomes high.

Second Embodiment

Figure 4:
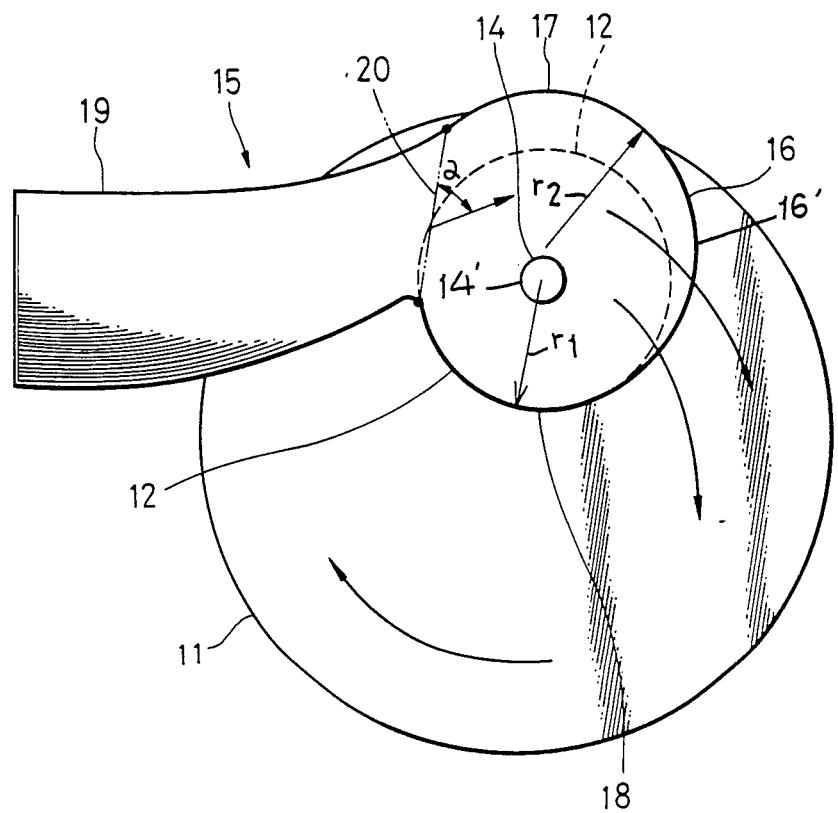
FIG. 4 is a top view of an inlet port of the 2nd embodiment of the present invention.
Figure 5:
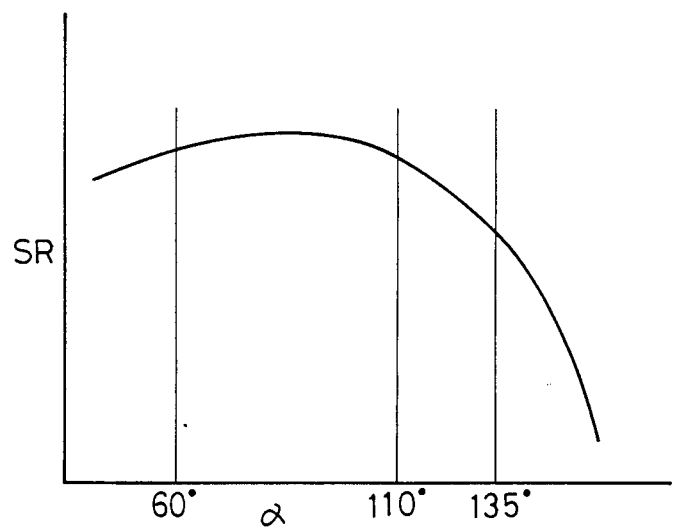
FIG. 5 is a graph indicating the relation of the connection angle of the introducting section and the outside part of the swirl generating section to the swirl ratio of the inlet port.

Referring now to FIGS. 4 and 5, the different points on this inlet port of the second embodiment from that of the first embodiment are explained as follows. The wall surface 16' of the swirl generating section 16 is formed by smoothly connecting sections of two cylindrical surfaces having respective radii $r_1$ and $r_2$, the cylindrical surfaces facing to the peripheral surface 14' of the valve stem 14 of the inlet valve 13. The cylindrical surface having radius $r_1$ is positioned proximate inside part 18 of the swirl generating section along the edge of the inlet hole 12 and the cylindrical surface having radius $r_2$ is positioned proximate outside part 17 of the swirl generating section outside the edge of the inlet hole 12. The introducing section 19 which has a square cross section and curves within a plane parallel to the end face of the cylinder chamber 11 is connected to the outside part 17 of the swirl generating section 16 which is wider than the inside part 18. This connection angle is set to a certain angle so that the main stream of the air flow from the introducing section 19 to the swirl generating section 16 flows in between the wall surface 16' of the outside part 17 for the swirl generating section and the peripheral surface 14' of the valve stem 14. Other points are similar to these of the first embodiment, marked with the same reference numbers in FIG. 4, and their descriptions are omitted.

On the inlet port of the second embodiment, the connecting angle of the introducing section 19 and the outside part 17 of the swirl generating section, i.e. the angle, $\alpha$, which is made between the main stream of the inlet air flow from the introducing section 19 to the swirl generating section 16 and the connecting plane 20 including the connecting line of the wall surface 16' of the outside part 17 for the swirl generating section and the outside surface of the introducing section 19 and the connecting line of the wall surface 16' of the inside part 18 for the swirl generating section and the inside surface of the introducing section 19 is set to various values. The swirl ratio was measured for each value of the connecting angle. It was found as can be seen from the graph of FIG. 5 that the swirl ratio, SR, was high when the angle was not less than 60 degrees and not more than 110 degrees. When the connecting angle, $\alpha$, exceeds 135 degrees, the main stream of the inlet air flow from the introducing section 19 to the swirl generating section 16 collides with the valve stem 14 to be divided and the swirl becomes weak and unstable as in the case for the tangential inlet port.

What we claim is:

1. An internal combustion engine comprising:
   a cylinder chamber having an end face and a wall surface;
   means defining an off-center inlet hole in said end face; and
   an inlet port for directing inlet air into said cylinder chamber, said inlet port comprising:
   a swirl generating section being connected to said inlet hole; and
   a straight, elongated introducing section connected to said swirl generating section, wherein:
   said swirl generating section surrounds said valve stem;
   said swirl generating section comprises a wall surface having an outside part proximate and substantially parallel to the portion of said wall surface of said cylinder chamber closest to said inlet hole and an inside part coinciding with the edge of said inlet hole;
   the width between said peripheral surface of said valve stem and said wall surface of said swirl generating section gradually decreases from said outside part up to said inside part and is constant at said inside part;
   the height of said wall surface of said swirl generating section decreases gradually from said outside part to said inside part at an average rate of not less than 0% and not more than 0.18% of the diameter of said inlet hole per 1 degree around said valve stem; and
   said elongated introducing section is connected to said outside part smoothly so that the main stream of the inlet air flows from said elongated introducing section into a position between said wall surface of said outside part and the peripheral surface of said valve stem and further flows through said inlet hole into said cylinder chamber along the tangential direction of said wall surface of said cylinder chamber closest to said inlet hole without being turned spirally around said valve stem, whereby the main stream of the inlet air flows along said wall surface of said cylinder chamber to produce swirl.

2. The internal combustion engine of claim 1, wherein said introducing section is connected to said outside part of said swirl generating section at a tangent to said outside part.

3. The internal combustion of claim 1, wherein said wall surface is defined by smoothly connected sections of first, second, and third cylindrical surfaces having respective first, second, and third radii.

4. The internal combustion engine of claim 1, wherein said wall surface is defined by smoothly connected sections of first and second radii, said first cylindrical surface coinciding with said inside part and said second cylindrical surface coinciding with the remainder of said wall surface.

5. The internal combustion engine of claim 1, wherein said swirl generating section has a ceiling substantially parallel to said end face of said cylinder chamber.

6. The internal combustion engine of claim 1, wherein said valve stem and said cylinder chambers have longitudinal axes and said longitudinal axis of said valve stem is parallel to said longitudinal axis of said cylinder chamber.

7. The internal combustion engine of claim 1, the connection between outside part of said wall surface of said swirl generating surface and said introducing section defining a connecting plane, said connecting plane being located at an angle with respect to the main stream of inlet air flowing from said introducing section to said swirl generating section, whereby the main stream of inlet air flows between said wall surface of said outside part of said swirl generating section and said peripheral surface of said valve stem.

8. The internal combustion engine of claim 7, the angle between said connecting plane and the main stream of inlet air being in the range of approximately 60 degrees to approximately 110 degrees.

9. The internal combustion engine of claim 7, wherein said introducing section has a substantially square cross-section and comprises opposed planar top and bottom walls and opposed curved side walls, said top and bottom walls being parallel to said end face of said cylinder end face.

10. The internal combustion engine of claim 7, wherein said introducing section has a substantially square cross-section and comprises opposed planar top and bottom walls and opposed side walls.

* * * * *